United States Patent [19]

Mizuno et al.

[11] 4,037,407
[45] July 26, 1977

[54] EXHAUST GAS PURIFICATION SYSTEM FOR INTERNAL COMBUSTION ENGINES

[75] Inventors: Yukio Mizuno, Tachikawa; Midori Hiramoto, Tanashi, both of Japan

[73] Assignee: Fuji Jukogyo Kabushiki Kaisha, Tokyo, Japan

[21] Appl. No.: 605,157

[22] Filed: Aug. 15, 1975

[30] Foreign Application Priority Data

Nov. 28, 1974 Japan .............................. 49-137321

[51] Int. Cl.² .......................... F01N 3/00; F01N 7/00
[52] U.S. Cl. ...................................... 60/277; 60/293; 60/312
[58] Field of Search ................. 60/323, 324, 304, 305, 60/278, 293, 322, 277, 282, 312

[56] References Cited

U.S. PATENT DOCUMENTS

| 3,172,251 | 3/1965 | Johnson | 60/278 |
| 3,413,803 | 12/1968 | Rosenlund et al. | 60/282 |
| 3,445,195 | 5/1969 | Benteler et al. | 60/277 |
| 3,468,124 | 9/1969 | Hraboweckyj | 60/305 |
| 3,662,541 | 5/1972 | Sawada et al. | 60/293 |
| 3,703,082 | 11/1972 | Santiago et al. | 60/282 |
| 3,788,070 | 1/1974 | Camarasa et al. | 60/290 |
| 3,836,338 | 9/1974 | Arnold | 60/303 |
| 3,904,374 | 9/1975 | Rosenlund | 60/322 |
| 3,906,722 | 9/1975 | Garcea | 60/293 |
| 3,946,558 | 3/1976 | Beekhuis | 60/282 |

*Primary Examiner*—Carlton R. Croyle
*Assistant Examiner*—Thomas I. Ross
*Attorney, Agent, or Firm*—Martin A. Farber

[57] ABSTRACT

An internal combustion gasoline engine comprises a determined region which is so formed in an exhaust passage from an exhaust valve to a thermal reactor as to pass exhaust gases therethrough in their discharging order, a secondary air passage with a check valve means communicating with the exhaust port near the exhaust valve, and means for maintaining the temperature of exhaust gases over the trigger temperature of the thermal reactor. The exhaust passage has a volume equal to or more than the displacement of the engine and less than four times the displacement volume and has a cross-sectional area less than three times the opening area of the exhaust valve.

1 Claim, 7 Drawing Figures

EXHAUST GAS PURIFICATION SYSTEM FOR INTERNAL COMBUSTION ENGINES

DETAILED DESCRIPTION OF THE INVENTION

The present invention relates to an internal combustion gasoline engine improved to purify exhaust gases in such manner that the pressure pulsation in an exhaust passage is used to suck in secondary air near an exhaust port, thereby to cause the oxidation of the exhaust gases in an after-treating device.

In order to reduce carbon monxide and hydrocarbons, hereinafter referred to as Co and HC, respectively, a thermal reactor is well-known as an after-treating device. A typical thermal reactor has an expanded chamber directly communicated to the exhaust port of an engine to induce exhaust gases therein at a high temperature and to mix the exhaust gases so as to achieve a continuous oxidation reaction.

Let such a thermal reactor loses the socalled "pulsation effect" or "tuning effect" an exhaust gas stream can produce in an exhaust passage reactor is directly connected to the exhaust port.

Absence of the 37 pulsation effect " necessitates that a secondary air introducing device such as an air pump be provided An object of this invention is to provide an internal combustion gasoline engine having a very simple construction of an exhaust system which includes an exhaust passage with a special configuration and a determined volume defined hereinafter, and an expanded chamber in communication after the exhaust passage.

The exhaust passage has means for supplying secondary air to the exhaust port by use of exhaust gas pulsation, and means for maintaining exhaust gases passing through the expanded chamber together with secondary air therein at a higher temperature than the trigger temperature of the thermal reactor, so that the thermal reactor acts to sufficiently reduce CO and HC.

In this case, the secondary air supplying means includes a secondary air passage with a check valve in order to inhibit the escape of the introduced secondary air. Because of the use of the pressure pulsation of the exhaust gases, it is not necessary to provide a pump driven by the engine. The pressure pulsation is generated in the exhaust passage, mentioned above, having the special configuration by which the exhaust gases continuously and smoothly therethrough in their discharge order, i.e. with a simple construction having no expanded volume.

The check valve is adapted to open to intake air from the outside when the inner pressure of the exhaust passage is lower than the atmospheric pressure, and to prevent the exhaust gases from flowing outwardly when the inner pressure of the exhaust passage higher than above the atmospheric pressure. Accordingly, an amount of secondary air is dependent on the degree of negative pressure and the period of the exhaust pulsation.

The present invention will be more fully understood from the following description with reference to the accompanying drawings, in which.

Figure 1:
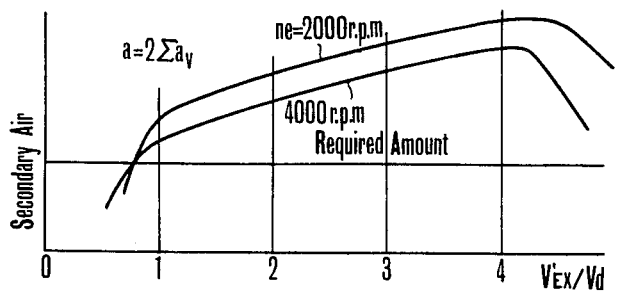
FIG. 1 is a graph showing a relationship between the volume of the exhaust passage and the amount of secondary air.
Figure 2:
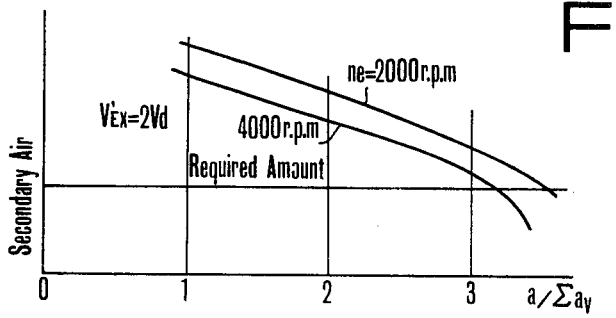
FIG. 2 is a graph showing a relationship between the sectional area of the exhaust passage and the amount of secondary air.
Figure 3:
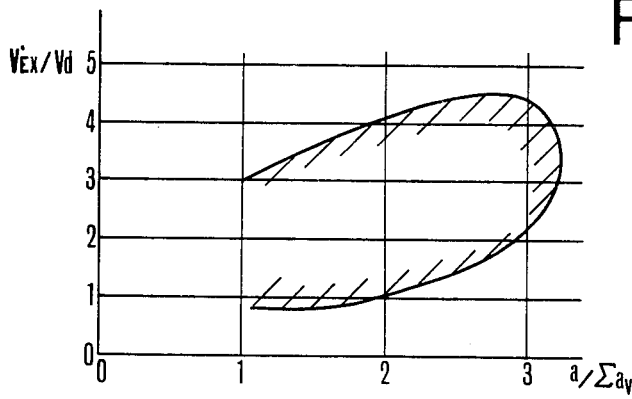
FIG. 3 is a graph showing a zone to obtain a sufficient amount of secondary air.

The inventors conducted an experiment on the variation of the amount of the secondary air according to the volume and cross-sectional area of the exhaust passage, thereby to obtain the resultant data as shown in FIGS. 1 to 3.

FIG. 1 includes a vertical axis for intake amounts of the secondary air, and a horizontal axis for the ratio of the volume (V'ex) of the exhaust passage which extends from the exhaust valve to the inlet of an expanded chamber or thermal reactor to the volume (Vd) of the displacement of the engine. Here, the volume (V'ex) should be so formed as to pass exhaust gases therethrough continuously and smoothly in their discharging order. Curve lines in FIG. 1 are given in accordance with the engine revolutions of 2,000 r.p.m. and 4,000 r.p.m. in that case where the cross-sectional area (a) of the exhaust passage is twice as large as the maximum opening area (av) of the exhaust valve or the total maximum opening area ($\Sigma$ av) of the exhaust valves if said valves are simultaneously operated to a common exhaust passage.

FIG. 2 includes a vertical axis for intake amounts of the secondary air, and a horizontal axis for ratio of the cross-sectional area (a) of the exhaust passage to the maximum opening area (av) of the exhaust valve or the total maximum opening area ($\Sigma$ av) of the exhaust valves. Curve lines in FIG. 2 are given in accordance with the engine revolutions of 2,000 r.p.m. and 4,000 r.p.m. in that case where the volume (V'ex) of the exhaust passage is twice as large as the volume (Vd) of the engine displacement.

Consequently, we will understand that in order to obtain the desired amount of air, V'ex/Vd should be selected in a region from 1 to 4 in reference to FIG. 1, and a/av or a/$\Sigma$ av should be defined below three in reference to FIG. 2.

In reference to FIG. 3 which shows overall test results when a/$\Sigma$ av and V'ex/Vd are changed below 4,000 r.p.m., we can understand that the volume and cross-sectional area of the exhaust passage should be selected within the hatdred zone to maintain the sufficient amount of secondary air.

The exhaust passage according to this invention is advantageous sufficient pulsation effect by having a configuration formed to pass the exhaust gases in their discharging order without their mixing effect and a suitable volume and cross-sectional area. In this case, it is necessary to maintain the exhaust gases at the downstream end of the exhaust passage above a temperature (the trigger temperature of a thermal reactor) sufficient to oxidize the combustible components of the exhaust gases with a mixing effect as the exhaust gases are introduced into the thermal reactor.

Figure 4:
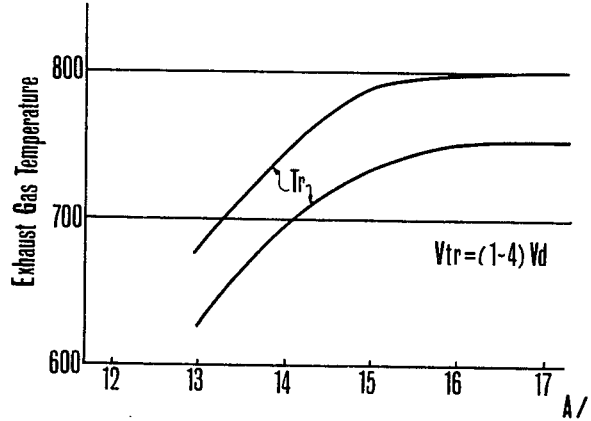
FIG. 4 is a graph showing a relationship between the air fuel ratio and the exhaust gas temperature.

FIG. 4 indicates this trigger temperature given experimentally in accordance with the air fuel ratio and the volume (Vtr) of the thermal reactor. There are illustrated two curved lines for the trigger temperature, the upper side one corresponding to the same volume of the thermal reactor as that of the engine displacement, and the lower side one corresponding to the volume of the former being four times that of the latter.

In the case where the thermal reactor of this invention is used in general type engines, it is required to heat-insulate the exhaust passage, which includes an exhaust port and an exhaust pipe, to prevent the exhaust gases from radiating heat, because the exhaust gases in passing through the exhaust passage have a temperature often apt to be reduced below the trigger temperature.

However, the engine as set in the retarding ignition or the exhaust gas recirculation, may include no heat-insulation for the exhaust passage because of the high temperature measured at the back portion of the exhaust valve.

Other features and advantages of this invention will be understood from the following description of a preferred embodiment thereof with reference to the other accompanying drawings.

Figure 5:
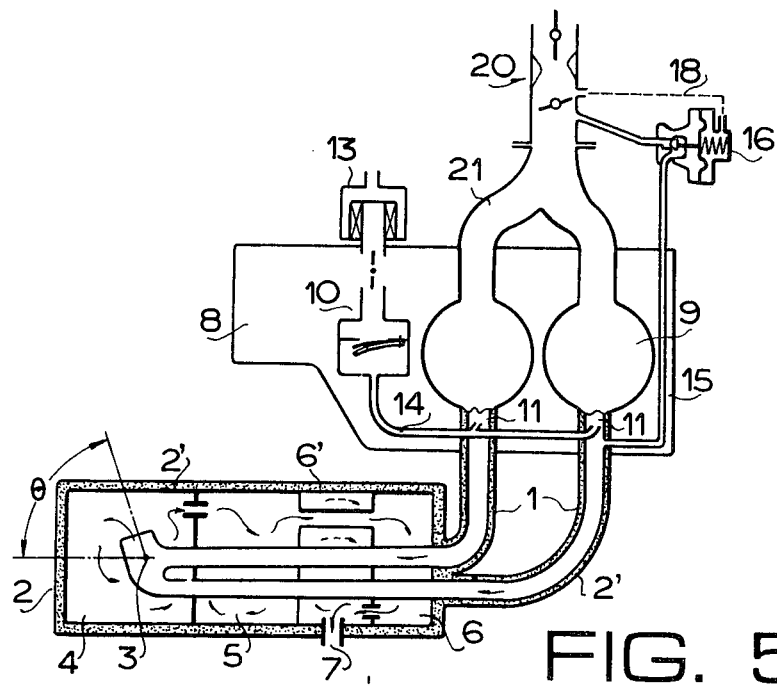
FIG. 5 is a schematic illustration showing an embodiment of the present invention.

FIG. 5 illustrates an engine 8 according to the present invention including two exhaust pipes, which extend from the exhaust port 11 communicating with a cylinder 9, respectively, to an expanded chamber 4 of a thermal reactor 2 or muffler. The exhaust pipes 1 lead into the thermal reactor 2 with their rear ends opened at a collective portion 3 in the expanded chamber 4 in a manner directed at an angle $\theta$ to the pipe line. The flow of the exhaust gases are bent at the angle $\theta$, which may be selected from 30° to 70°, so as to mix the exhaust gases with secondary air. The length of the exhaust pipes in the muffler is adjustable to maintain the prescribed secondary air to be sucked. The collective part opening at a suitable direction by the angle $\theta$ is available to prevent the end plates 106a, 106b (FIG. 6) from heat damage. The expanded chamber 4 is formed in the thermal reactor 2. Each of the exhaust passages which include the exhaust port in the cylinder head and the exhaust pipe is so formed as to pass the exhaust gases therethrough in their discharging order, and has a volume and cross-sectional area limited in the hatching area of FIG. 3. The exhaust port is covered by liners and the outer disclosed portion of the exhaust pipe 1 is also covered by a heat-insulation material.

The thermal reactor 2 further includes muffler chamber 5, 6, 6', through which the expanded chamber 4 communicates with a tail pipe 7.

With the exhaust ports 11 there communicates a secondary air passage 14 with a check valve 10 connected to an air filter 13. A passage 15 also communicates with the exhaust port 11 so as to send the exhaust gases through a diaphragm valve 16 to an intake manifold 21 for exhaust gas recirculation. The diaphragm valve is operated to open by the negative pressure of a passage 18 opening into a carburetor 20.

In operation, the exhaust gases are recirculated to the intake system through the valve 16, so that the combustion in the cylinders is delayed so to be adjusted, bringing the combustion closer to the constant-temperature combustion. Consequently, the exhaust gases pass through the exhaust passage at a high temperature as the exhaust valve is opened. In this case, the high temperature of the exhaust gases is maintained by the heat-insulation material until they arrive at the thermal reactor 2.

The secondary air is sufficiently supplied from the air filter 13 to the exhaust port via the check valve 10, because the exhaust passage has a volume and a passing cross-sectional area defined within the hatching area of FIG. 3 so as to generate the exhaust pulsation required for intaking of the secondary air.

In the expanded chamber 4, the exhaust gases are mixed by their turbulance at a temperature higher than the trigger temperature of the thermal reactor 2, so as to oxidize the combustible components and then thereby to reduce CO and HC.

Figure 6:
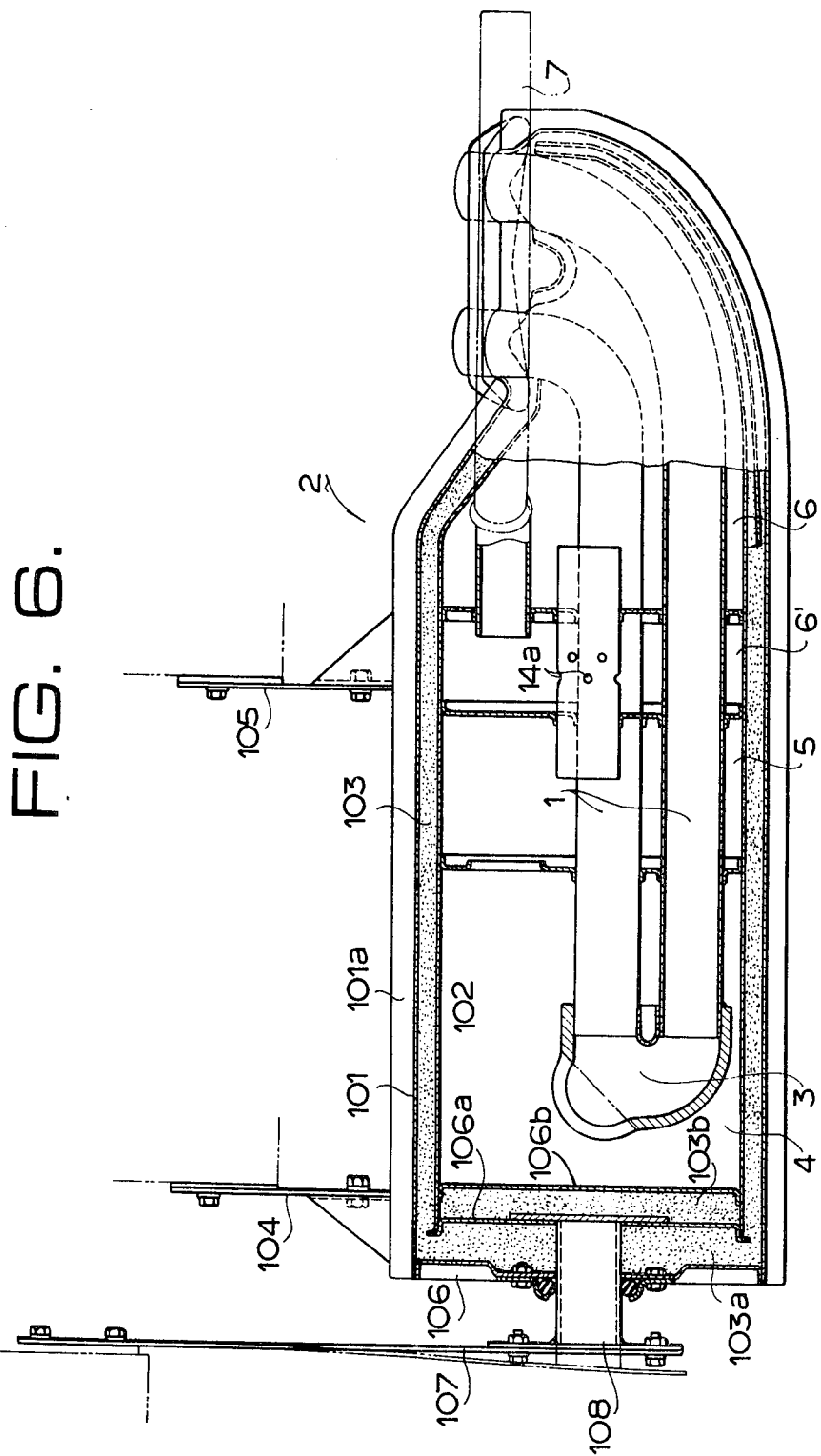
FIG. 6 is a larger scale sectional view of a thermal reactor according to the present invention.

The thermal reactor 2 serving as a muffler may comprise a double shell structure shown in FIG. 6. Namely, the thermal reactor includes an outer shell 101 formed into a hollow cylinder having an oval section by combination of two half-shell members having flanges 101a connected to each other, and an inner shell 102 disposed in the outer shell 101.

The inner shell 102 is also formed into a hollow cylinder having an oval section coaxially positioned to that of the outer shell 101.

A heat-insulation material 103 is filled in a space formed between the shells 101 and 102. The double shell structure is supported to the chassis by two suspension plates 104 and 105, and has three end plates 106, 106a and 106b and two heat-insulation layer 103a and 103b each disposed between adjacent two members of the end plates. The double shell structure is further supported at its end by means of a suspension plate 107 of spring steel, which includes a tubular rod 108 slidably penetrating the outer end plate 106 and rigidly connected to the middle end plate 106a by welding means. Accordingly, the outer shell 101 avoids the thermal expansion stress by the sliding of the rod 108 relative to the outer shell 101 and the outer end plate 106, by the rod 108 being pushed outwardly together with the end plates 106a and 106b by the thermal expansion of the inner shell 102 and the plate spring 107 bending as indicated in dot-dashed lines.

Figure 7:
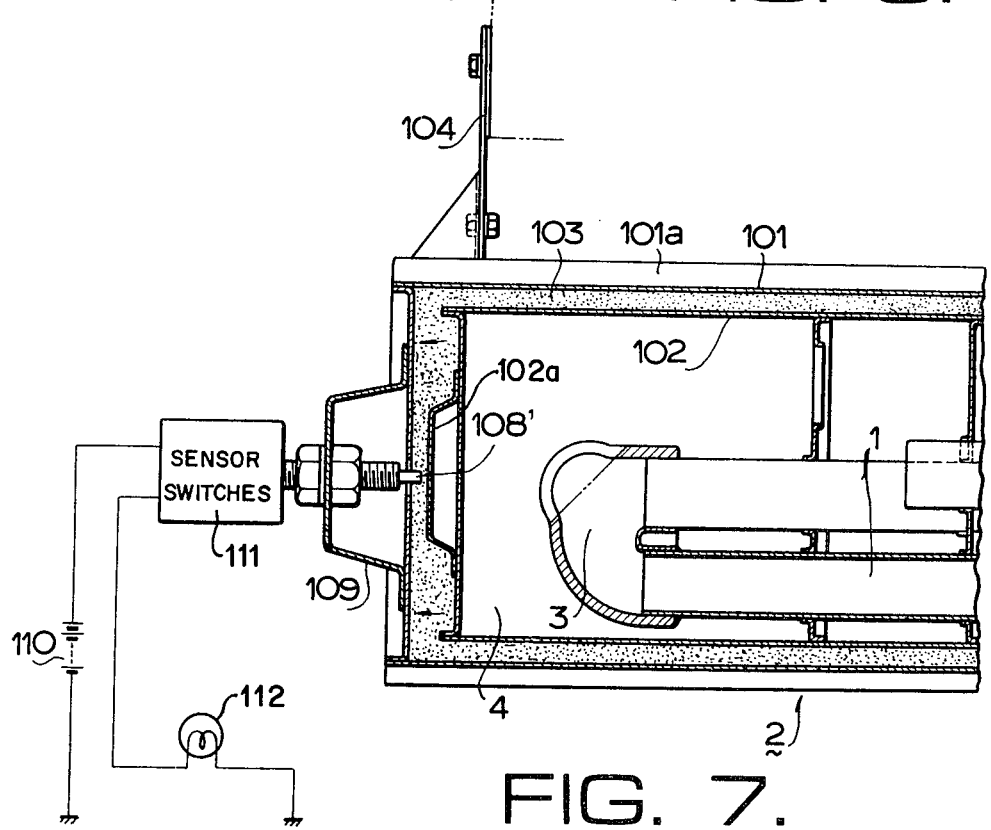
FIG. 7 is a sectional view of the end portion of the thermal reactor provided with a misfire sensing device.

In order to detect a misfiring of the engine, a sensor may be disposed at the end portion of the thermal reactor 2. This sensor is shown, for example, in FIG. 7.

In this embodiment, the sensor includes a push rod 108' facing the end plate 102a of the inner shell 102 and is supported on a bracket 109 attached to the outer end plate of the outer shell 101. When the engine misfires, the thermal reactor 2 also is sufficiently excited over the trigger temperature so as to apply the thermal expansion stress to the inner shell 102, and consequently the end plate 102a is moved to push the rod 108', whereby sensor switches 111 send a signal from a battery 110 to suitable information receiving device 112.

This informs a person that the thermal reactor 2 is to be protected from over-heating itself.

What is claimed is:

1. An exhaust gas purification system for internal combustion engines having an engine cylinder and an intake system thereto, comprising an exhaust valve having an opening area, an exhaust gas passage communicating with said exhaust valve having no expanded portion in which the exhaust gas thereby passes without stagnating or mixing with subsequent exhaust gas, a reactor communicating with said exhaust gas passage, a secondary air passage with a check valve means communicating with said exhaust gas passage, and means for maintaining the temperature of exhaust gas over a trigger temperature of said reactor, said exhaust gas passage having a volume at least equal to a displacement volume of the cylinder of the engine and less than four times the displacement volume and said exhaust gas passage having a cross-sectional area less than three times the opening area of said exhaust valve, said reactor further forms an expanded chamber and includes a double shell structure having an outer shell, and an inner shell with an end plate, a heat-insulation wall surrounding said expanded chamber between said inner shell and said outer shell, and a sensor means having a push rod facing adjacent to said end plate of said inner shell, for being actuated by movement of said end plate to push said push rod when said reactor is substantially excited over the trigger temperature due to engine misfire, whereby sensor switches are activated to send a signal from a power source to a receiving device.

* * * * *

UNITED STATES PATENT AND TRADEMARK OFFICE
CERTIFICATE OF CORRECTION

PATENT NO. : 4037407
DATED : July 26, 1977
INVENTOR(S) : Yukio Mizuno et al

It is certified that error appears in the above-identified patent and that said Letters Patent are hereby corrected as shown below:

COLUMN 2, Line 54 "hatdred" should read --hatched--

COLUMN 4, Line 26 "layer" should read --layers--

Signed and Sealed this

Eighteenth Day of October 1977

[SEAL]

Attest:

RUTH C. MASON
Attesting Officer

LUTRELLE F. PARKER
Acting Commissioner of Patents and Trademarks